US006022120A

United States Patent [19]

Chang

[11] Patent Number: 6,022,120

[45] Date of Patent: Feb. 8, 2000

[54] LIGHTING DEVICE FOR A STUN GUN

[75] Inventor: Hung-Yi Chang, Fengyuan, Taiwan

[73] Assignee: Tai E International Patent and Law Office, Taipei, Taiwan

[21] Appl. No.: 09/113,393

[22] Filed: Jul. 10, 1998

[51] Int. Cl.[7] .......................... F21V 33/00; B25B 23/18; F21L 7/00; H01G 23/00

[52] U.S. Cl. .......................... 362/109; 362/119; 362/186; 361/232

[58] Field of Search .................................... 362/109, 119, 362/253, 186, 208, 202, 455, 433; 361/232

[56] References Cited

U.S. PATENT DOCUMENTS 4,688,140 8/1987 Hammes ................................ 361/232
4,968,034 11/1990 Hsieh ...................................... 361/232
5,467,247 11/1995 De Anda et al. ....................... 361/232

*Primary Examiner*—Cassandra Spyrou
*Assistant Examiner*—Fayez Assaf
*Attorney, Agent, or Firm*—Gardere & Wynne, LLP; Stanford E. Warren, Jr.

[57] ABSTRACT

A lighting device is provided for a stun gun which includes a body portion having one end portion containing a receiving space having two side walls, two juxtaposed electric shock rods extending outward from the end portion of the body portion with the receiving space located therebetween, a power supply received in the body portion for supplying electricity to each of the two electric shock rods, and two opposite flexible electrodes each mounted on one of the two side walls of the receiving space and each electrically connected to the power supply. The lighting device includes a transparent housing having an insert column received in the receiving space, a reflector fixedly mounted in the transparent housing and containing an opening facing outward, an electric bulb fixedly mounted in the reflector to emit light outward through the opening, and two opposite conductive pieces each fixedly mounted on the insert column and each electrically connected with the electric bulb and each of the two opposite flexible electrodes.

8 Claims, 5 Drawing Sheets

LIGHTING DEVICE FOR A STUN GUN

FIELD OF THE INVENTION

The present invention relates to a lighting device, and more particularly to a lighting device for a stun gun.

BACKGROUND OF THE INVENTION

A conventional lighting device for a stun gun is shown in FIG. 5, and there will be a complete discussion in the detailed description of the preferred embodiments, concerning the conventional lighting device. The present invention has arisen to mitigate and/or obviate the disadvantage of the conventional lighting device.

SUMMARY OF THE INVENTION

In accordance with one aspect of the present invention, there is provided a lighting device for a stun gun which comprises a body portion including a first end portion containing a receiving space having two side walls and a second end portion, two juxtaposed electric shock rods extending outward from the first end portion of the body portion with the receiving space located therebetween, a power supply received in the body portion for supplying electricity to each of the two electric shock rods, and two opposite flexible electrodes each mounted on one of the two side walls of the receiving space and each electrically connected to the power supply.

The lighting device comprises a transparent housing including an insert column received in the receiving space, a reflector fixedly mounted in the transparent housing and containing an opening facing outward, an electric bulb fixedly mounted in the reflector to emit light outward through the opening, and two opposite conductive pieces each fixedly mounted on the insert column and each electrically connected with the electric bulb and each of the two opposite flexible electrodes.

Further benefits and advantages of the present invention will become apparent after a careful reading of the detailed description with appropriate reference to the accompanying drawings.

DETAILED DESCRIPTION OF THE PREFERRED EMBODIMENTS

Figure 5:
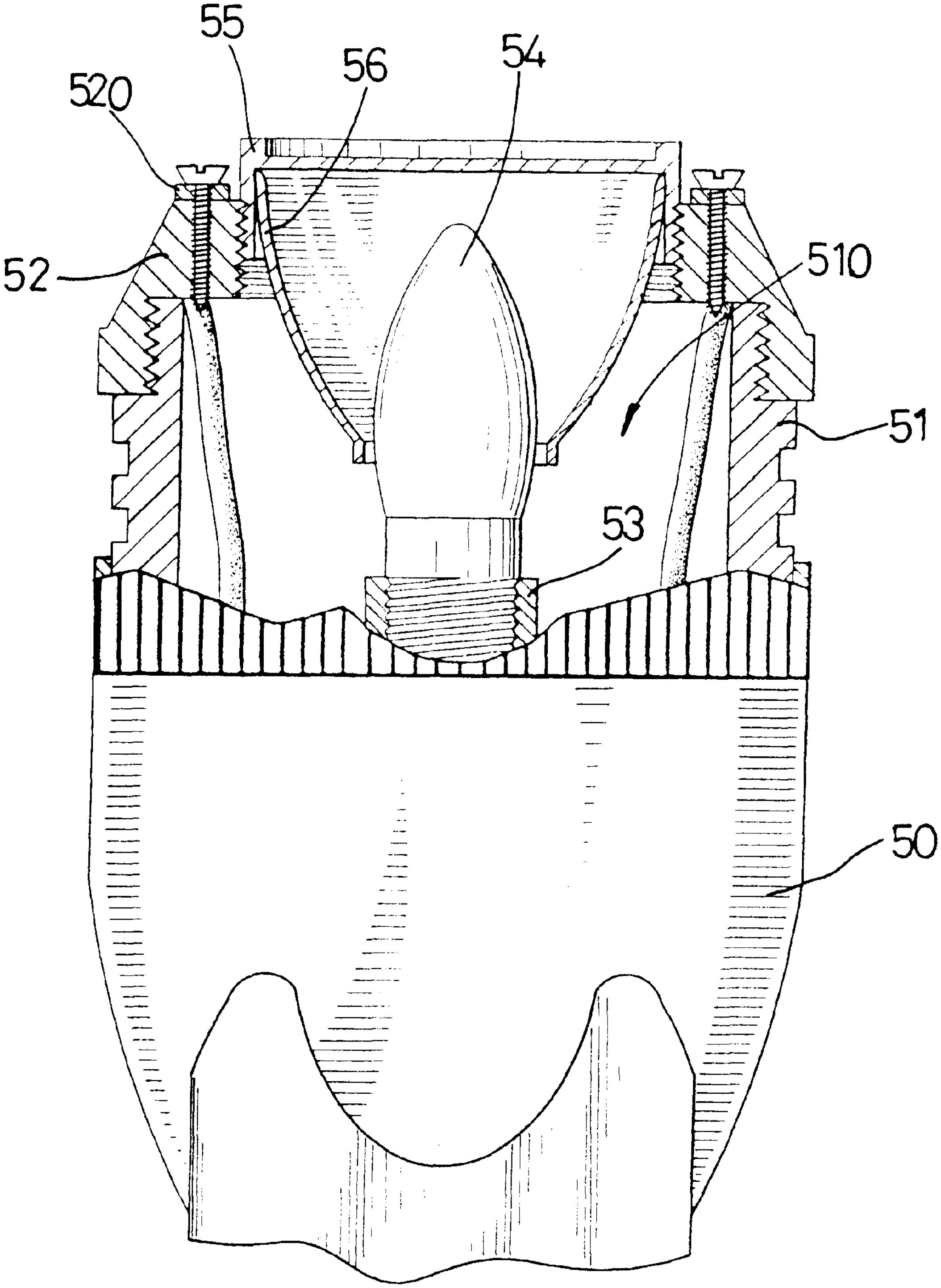
F I G.5 PRIOR ART
FIG. 5 is a front plan partially cross-sectional view of a conventional lighting device for a stun gun in accordance with the prior art.

For a better understanding of the present invention, reference is made to FIG. 5 illustrating a conventional lighting device for a stun gun in accordance with the prior art.

The stun gun comprises a body 50 including a top portion 51 containing a receiving space 510, an end cap 52 made of metallic material threaded onto the top portion 51 of the body 50, and two electric shock pieces 520 each fixedly mounted on the end cap 52. The conventional lighting device comprises a supporting base 53 mounted in the receiving space 510, an electric bulb 54 threaded onto the supporting base 53, a light diffuser 55 threaded into the end cap 52, and a reflector 56 made of metallic material fixedly mounted in the light diffuser 55 direct the light emitted from the electric bulb 54 to the surroundings, thereby providing an illumination function for the stun gun.

By such an arrangement, however, when the electric bulb 54 bumps out, a user has to unscrew the light diffuser 55 from the end cap 52 so as to unscrew the electric bulb 54 from the supporting base 53 to be replaced by a new electric bulb 54 which can be screwed into the supporting base 53 and the light diffuser 55 can then be screwed into the end cap 52 such that it is inconvenient for the user to replace the electric bulb 54 when it bums out. In addition, the electric current flowing between the two electric shock pieces 520 tends to be introduced into the electric bulb 54 via the end cap 52 and the reflector 56, thereby easily burning out the electric bulb 54.

Referring now to FIGS. 1–4, a lighting device 2 in accordance with the present invention can be adapted to fit in a stun gun which comprises a body portion 10 including a first end portion 11 containing a receiving space 13 having two side walls and a second end portion 16, two juxtaposed electric shock rods 12 extending outward from the first end portion 11 of the body portion 10 with the receiving space 13 located therebetween, a power supply 18 such as a set of batteries received in the second end portion 16 of the body portion 10 for supplying electricity to each of the two electric shock rods 12, and two opposite flexible electrodes 15 each mounted on one of the two side walls of the receiving space 13 and each electrically connected to the power supply 18. The stun gun further comprises a switch 17 mounted on the body portion 10 thereof for opening/closing the electric connection between the power supply 18 and the two electric shock rods 12, and for turning on/off electricity between the power supply 18 and the two conductive pieces 15. Each of the two flexible electrodes 15 is mounted on a lower portion of each of the two side walls of the receiving space 13. In addition, a first line connecting the two electric shock rods 12 is arranged perpendicularly to a second line connecting the two flexible electrodes 15.

The lighting device 2 comprises a transparent housing 20 including an insert column 23 received in the receiving space 13, a reflector 21 fixedly mounted in the transparent housing 20 and containing an opening 210 facing outward, an electric bulb 22 fixedly mounted in the reflector 21 to emit light outward through the opening 210, and two opposite conductive pieces 25 each fixedly mounted on the insert column 23 and each electrically connected with the electric bulb 22 and each of the two opposite flexible electrodes 15. The lighting device 2 further comprises two conducting wires 26 each including a first end portion electrically connected to the electric bulb 22 and a second end portion electrically connected to each of the two opposite conductive pieces 25.

The insert column 23 of the transparent housing 20 includes an outer wall formed with two pairs of juxtaposed positioning flanges 24, and each of the two conductive pieces 25 is received between each pair of the positioning flanges 24. In addition, the first end portion 11 of the body portion 10 of the stun gun contains two opposite retaining depressions 14 each open to the receiving space 13, and each pair of the positioning flanges 24 are received in each of the two retaining depressions 14.

Figure 2:
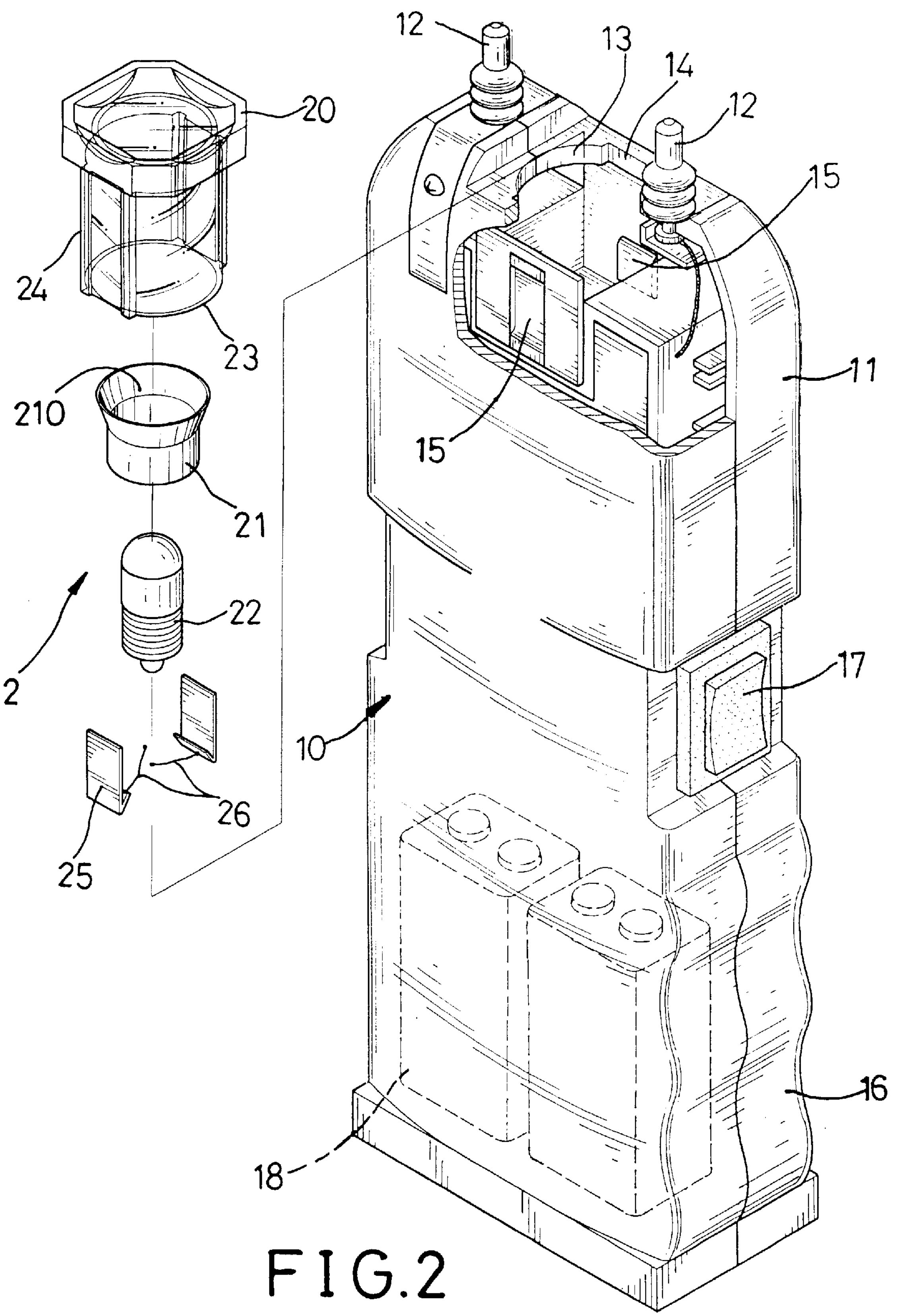
FIG. 2 is an exploded view of the lighting device as shown in FIG. 1.
Figure 3:
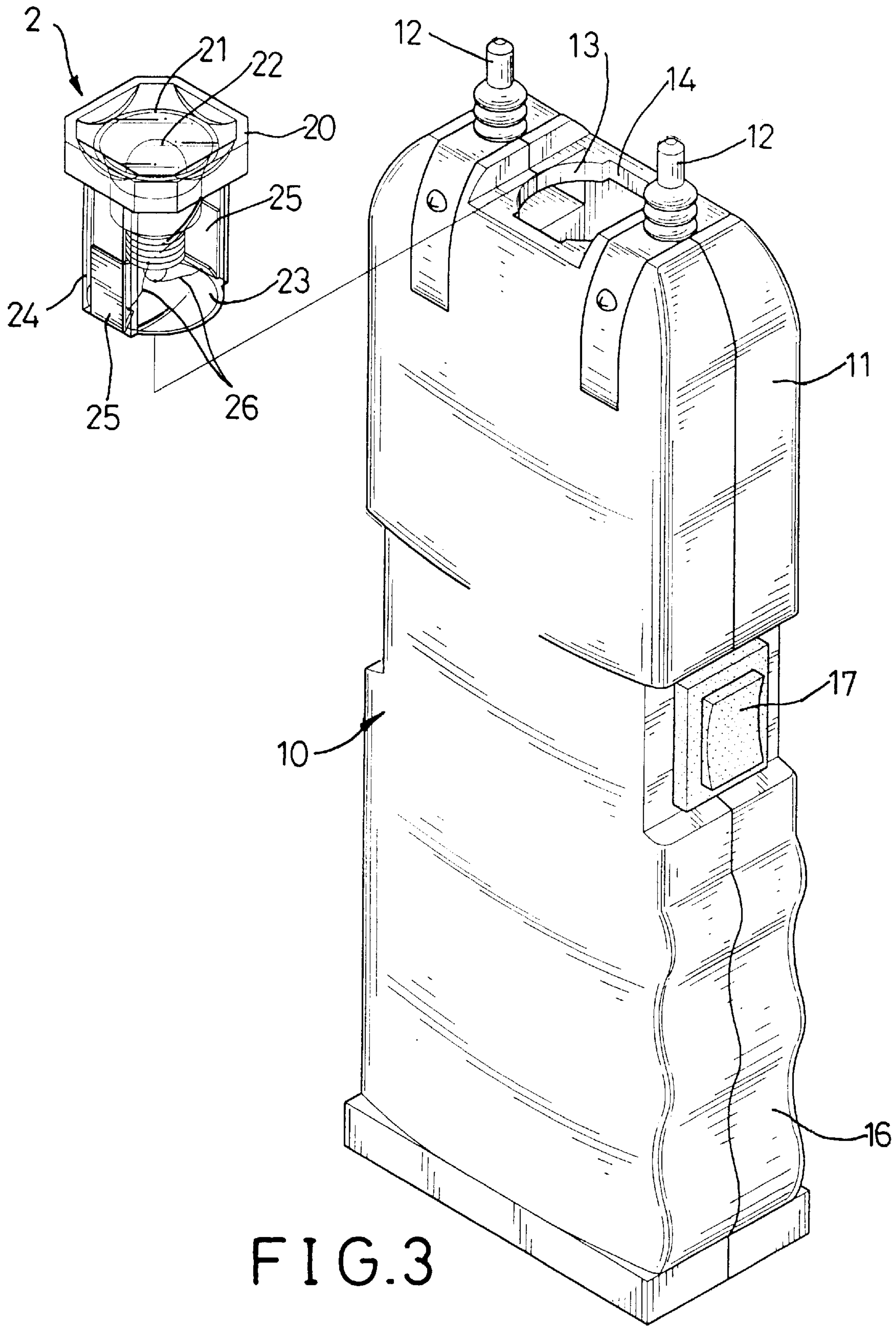
FIG. 3 is an assembly view of the lighting device as shown in FIG. 2.

In assembly, the reflector 21 can be inserted into the transparent housing 20, the electric bulb 22 can then be secured in the reflector 21, and each of the two conductive pieces 25 together with the conducting wire 26 can then be secured on the insert column 23 between the positioning flanges 24, thereby installing the parts as shown in FIG. 2 in the lighting device 2 as shown in FIG. 3.

Figure 1:
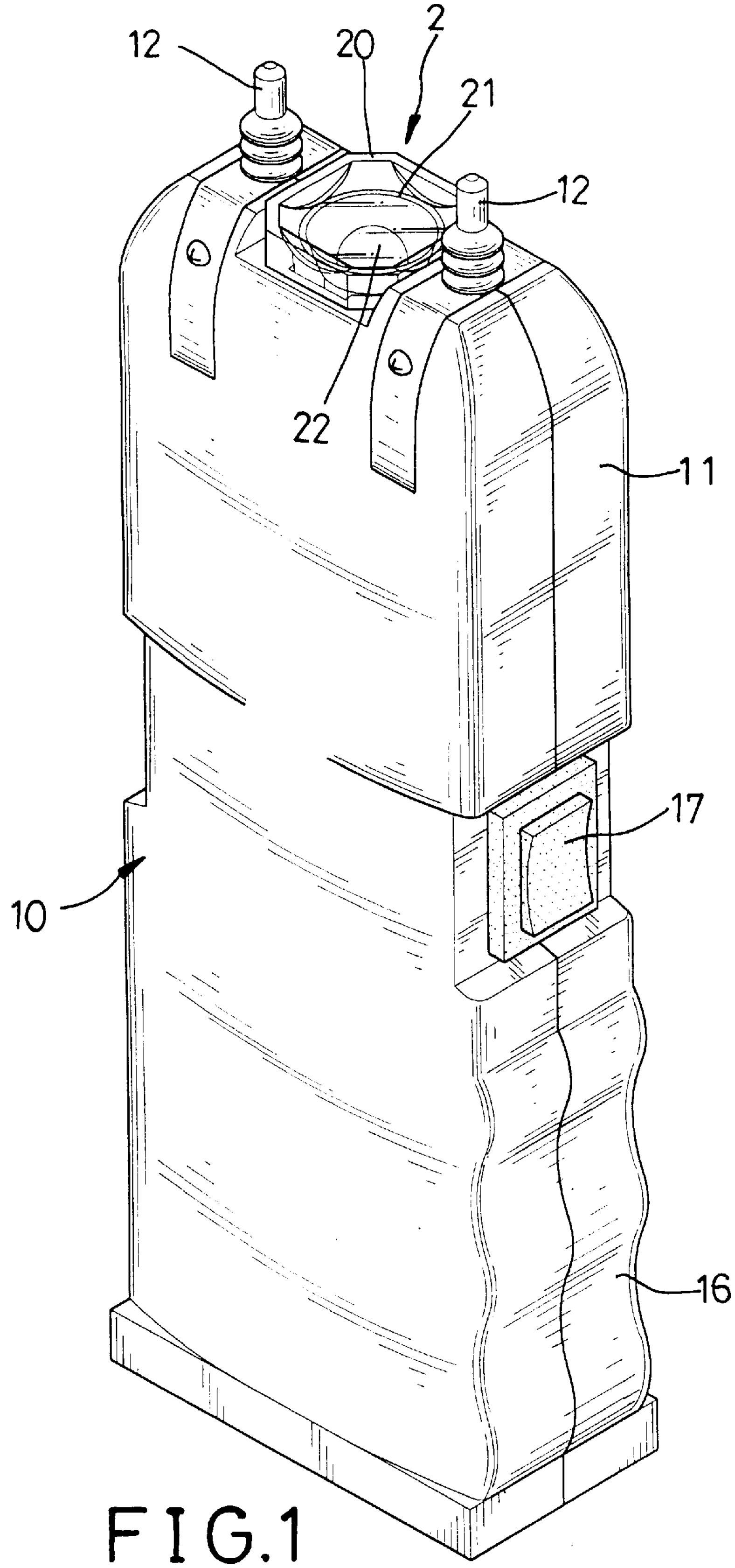
FIG. 1 is a perspective view of a lighting device for a stun gun in accordance with the present invention.
Figure 4:
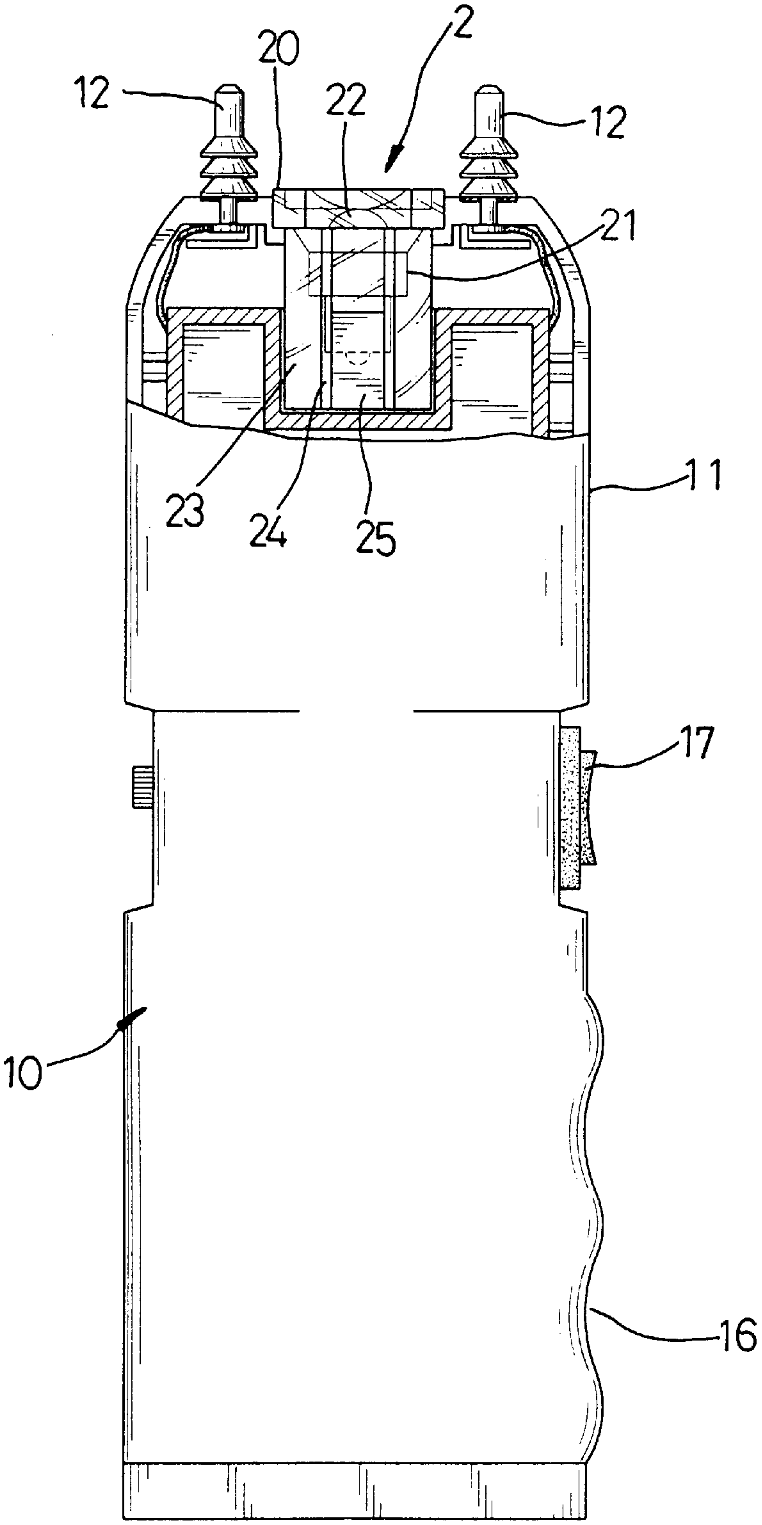
FIG. 4 is a front plan partially cross-sectional view of the lighting device as shown in FIG. 1.

The lighting device 2 can then be inserted into the receiving space 13 as shown in FIGS. 1 and 4 and can be retained therein in a stable manner by means of the positioning flanges 24 being retained by the depressions 14 while each of the two conductive pieces 25 can be inserted into the receiving space 13 to abut and press each of the two flexible electrodes 15 such that the lighting device 2 is able to be electrically connected to the power supply 18. The electric bulb 22 can then be powered by the power supply 18 via the switch 17 so as to emit light outward from the transparent housing 20 by means of the reflector 21, thereby capable of providing an illumination function to the stun gun.

The lighting device 2 can be removed from the receiving space 13 when the electric bulb 22 is inoperative, and can be replaced by a new lighting device 2 which can be easily inserted into the receiving space 13 for use.

When each of the two electric shock rods 12 is powered by the power supply 18 via the switch 17 such that an electric current with a high voltage is able to flow therebetween, the electricity will not be introduced into the electric bulb 22 due to it being received in the transparent housing 20, thereby preventing the electric bulb 22 from burning out.

It should be clear to those skilled in the art that further embodiments may be made without departing from the scope and spirit of the present invention.

What is claimed is:

1. A lighting device in combination with a stun gun which comprises a body portion (10) including a first end portion (11) containing a receiving space (13) having two side walls and a second end portion (16), two juxtaposed electric shock rods (12) extending outward from said first end portion (11) of said body portion (10) with said receiving space (13) located therebetween, a power supply (18) received in said body portion (10) for supplying electricity to each of said two electric shock rods (12), and two opposite flexible electrodes (15) each mounted on one of said two side walls of said receiving space (13) and each electrically connected to said power supply (18), said lighting device comprising:

a transparent housing (20) including an insert column (23) received in said receiving space (13);

a reflector (21) fixedly mounted in said transparent housing (20) and containing an opening (210) facing outward;

an electric bulb (22) fixedly mounted in said reflector (21) for emitting light outward through said opening (210); and two opposite conductive pieces (25) each fixedly mounted on said insert column (23) and each electrically connected with said electric bulb (22) and each of said two opposite flexible electrodes (15).

2. The lighting device in accordance with claim 1, further comprising two conducting wires (26) each including a first end portion electrically connected to said electric bulb (22) and a second end portion electrically connected to each of said two opposite conductive pieces (25).

3. The lighting device in accordance with claim 1, wherein said insert column (23) of said transparent housing (20) includes an outer wall formed with two pairs of juxtaposed positioning flanges (24), and each of said two conductive pieces (25) is received between each pair of said positioning flanges (24).

4. The lighting device in accordance with claim 3, wherein said first end portion (11) of said body portion (10) of said stun gun contains two opposite retaining depressions (14) each open to said receiving space (13), and each pair of said positioning flanges (24) are received in each of said two retaining depressions (14).

5. The lighting device in accordance with claim 1, wherein said stun gun further comprises a switch (17) mounted on said body portion (10) thereof for opening/closing the electric connection between said power supply (18) and said two electric shock rods (12).

6. The lighting device in accordance with claim 5, wherein said switch (17) is provided for opening/closing the electric connection between said power supply (18) and said two conductive pieces (15).

7. The lighting device in accordance with claim 1, wherein each of said two flexible electrodes (15) is mounted on a lower portion of each of said two side walls of said receiving space (13).

8. The lighting device in accordance with claim 1, wherein a first line connecting said two electric shock rods (12) is arranged perpendicularly to a second line connecting said two flexible electrodes (15).

* * * * *

UNITED STATES PATENT AND TRADEMARK OFFICE

CERTIFICATE OF CORRECTION

PATENT NO : 6,022,120

DATED : February 8, 2000

INVENTOR(S) : Hung-Yi CHANG

It is certified that error appears in the above-identified patent and that said Letters Patent are hereby corrected as shown below:

On the Title Page

Please change the typewritten name of inventor to read as follows:

Hung-Yi CHANG

Please change the section consisting of assignee information to denote no assignee.

Signed and Sealed this

Tenth Day of April, 2001

Attest:

NICHOLAS P. GODICI

*Attesting Officer*

*Acting Director of the United States Patent and Trademark Office*